(12) United States Patent
Akiyama et al.

(10) Patent No.: US 10,277,613 B2
(45) Date of Patent: Apr. 30, 2019

(54) URL MATCHING APPARATUS, URL MATCHING METHOD, AND URL MATCHING PROGRAM

(71) Applicant: NIPPON TELEGRAPH AND TELEPHONE CORPORATION, Chiyoda-ku (JP)

(72) Inventors: Mitsuaki Akiyama, Musashino (JP); Takeshi Yagi, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 231 days.

(21) Appl. No.: 15/103,080

(22) PCT Filed: Dec. 8, 2014

(86) PCT No.: PCT/JP2014/082427
§ 371 (c)(1),
(2) Date: Jun. 9, 2016

(87) PCT Pub. No.: WO2015/087835
PCT Pub. Date: Jun. 18, 2015

(65) Prior Publication Data
US 2018/0145993 A1 May 24, 2018

(30) Foreign Application Priority Data
Dec. 10, 2013 (JP) .................. 2013-255096

(51) Int. Cl.
*H04L 29/06* (2006.01)
*G06F 21/55* (2013.01)
(Continued)

(52) U.S. Cl.
CPC .... *H04L 63/1416* (2013.01); *G06F 17/30675* (2013.01); *G06F 17/30864* (2013.01);
(Continued)

(58) Field of Classification Search
None
See application file for complete search history.

(56) References Cited

U.S. PATENT DOCUMENTS 7,013,304 B1    3/2006  Schüetze et al.
2005/0172031 A1* 8/2005  Adelman .......... G06Q 30/0241
                                                 709/245
(Continued)

FOREIGN PATENT DOCUMENTS

CN    1952947 A    4/2007
CN    102045360 A  5/2011
(Continued)

OTHER PUBLICATIONS

Pawan Prakash, et al. "PhishNet: Predictive Blacklisting to Detect Phishing Attacks" IEEE INFOCOM, XP031675097, 2010, pp. 1-5 (Year: 2010).*

(Continued)

*Primary Examiner* — Eleni A Shiferaw
*Assistant Examiner* — Andrew J Steinle
(74) *Attorney, Agent, or Firm* — Oblon, McClelland, Maier & Neustadt, L.L.P.

(57) ABSTRACT

A URL matching apparatus generates partial character string information storing therein, as keys of an associative array, partial character strings obtained by connecting stepwise in order from a character string of an upper layer of a hierarchical structure of one or more reference URLs. The URL matching apparatus generates partial character strings obtained by connecting stepwise in order from a character string of an upper layer of a hierarchical structure, also for a URL to be matched, and for each of these partial character strings of the URL to be matched, searches the partial character string information with that partial character string (Continued)

being a key. Thereby, even if a URL is partially changed, matching is able to be performed at high speed.

6 Claims, 9 Drawing Sheets

(51) Int. Cl.
  *G06F 21/51* (2013.01)
  *G06F 17/30* (2006.01)
  *H04L 29/08* (2006.01)

(52) U.S. Cl.
  CPC .. *G06F 17/30887* (2013.01); *G06F 17/30985* (2013.01); *G06F 21/51* (2013.01); *G06F 21/554* (2013.01); *H04L 63/0236* (2013.01); *H04L 63/101* (2013.01); *H04L 63/1483* (2013.01); *H04L 67/02* (2013.01); *G06F 2221/2119* (2013.01); *H04L 63/168* (2013.01)

(56) References Cited

U.S. PATENT DOCUMENTS

2012/0130983 A1* 5/2012 Ryan ................ G06F 17/30985
                                                                    707/715
2014/0258260 A1* 9/2014 Rayborn ........... G06F 17/30864
                                                                    707/707

FOREIGN PATENT DOCUMENTS

CN          102339320 A      2/2012
JP          2012-94071 A     5/2012
JP          2012-118713 A    6/2012

OTHER PUBLICATIONS

Extended European Search Report dated May 12, 2017 in Patent Application No. 14869490.4.
Nen-Fu Huang, et al. "A Fast URL Lookup Engine for Content-Aware Multi-gigabit Switches," IEEE, vol. 1,XP 010789867, 2005, 6 pages.
Pawan Prakash, et al. "PhishNet: Predictive Blacklisting to Detect Phishing Attacks" IEEE INFOCOM, XP031675097, 2010, pp. 1-5.
M. Akiyama, et al., "Determining granularity of URL filtering based on tree structure of malicious website URL," IEICE Technical Report, 2010, vol. 110, No. 266, 33 pages (with partial English translation).
M. Akiyama, et al., "Blacklist expansion by search engine based neighbor discovery of malicious site's URL," Computer Security Symposium 2010 Ronbunshu, 2010, vol. 2010, No. 9, 23 pages (with partial English translation).
"Safe Browsing API—Google Developers," <https://developers.google.com/safe-browsing/>, retrieved from the Internet on Nov. 5, 2013, 1 page.
Z. Zhou, et al., "A High-Performance URL Lookup Engine for URL Filtering Systems," IEEE ICC 2010 Proceedings, 2010, 5 pages.
International Search Report dated Mar. 10, 2015 in PCT/JP2014/082427 Filed Dec. 8, 2014.
Office Action dated Jul. 13, 2018 in Chinese Application No. 201480066821.3 (w/English translation).

* cited by examiner

| REFERENCE URL | URL PARTIAL CHARACTER STRING |
|---|---|
| http://www.example.co.jp/path1/path2/index.php?id=123 | example.co.jp |
| | www.example.co.jp |
| | www.example.co.jp/path1/ |
| | www.example.co.jp/path1/path2/ |
| | www.example.co.jp/path1/path2/index.php? |
| | www.example.co.jp/path1/path2/index.php?id=123 |

| KEY | VALUE |
|---|---|
| example.co.jp | PARTIAL DOMAIN |
| www.example.co.jp | COMPLETE DOMAIN |
| www.example.co.jp/path1/ | COMPLETE DOMAIN AND PARTIAL PATH |
| www.example.co.jp/path1/path2/ | COMPLETE DOMAIN AND PARTIAL PATH |
| www.example.co.jp/path1/path2/index.php? | COMPLETE DOMAIN AND COMPLETE PATH |
| www.example.co.jp/path1/path2/index.php?id=123 | COMPLETE DOMAIN AND COMPLETE PATH |

| REFERENCE URL | URL PARTIAL CHARACTER STRING |
|---|---|
| http://www.example.co.jp/path1/path2/index.php?id=123 | *.example.co.jp |
| | *.example.co.jp/path1/ |
| | *.example.co.jp/path1/path2/ |
| | *.example.co.jp/path1/path2/index.php? |
| | *.example.co.jp/path1/path2/index.php?id=123 |

FIG.7

| KEY | VALUE |
|---|---|
| *.example.co.jp | PARTIAL DOMAIN |
| *.example.co.jp/path1/ | PARTIAL DOMAIN AND PARTIAL PATH |
| *.example.co.jp/path1/path2/ | PARTIAL DOMAIN AND PARTIAL PATH |
| *.example.co.jp/path1/path2/index.php? | PARTIAL DOMAIN AND COMPLETE PATH |
| *.example.co.jp/path1/path2/index.php?id=123 | PARTIAL DOMAIN AND COMPLETE PATH |

FIG.12

URL MATCHING APPARATUS, URL MATCHING METHOD, AND URL MATCHING PROGRAM

FIELD

The present invention relates to a uniform resource locator (URL) matching apparatus, a URL matching method, and a URL matching program.

BACKGROUND

In order to protect users using the World Wide Web (WWW) from malicious Web sites and malicious Web contents, filtering is conducted. By use of blacklists indicating URLs (malicious URLs) of malicious Web sites and malicious Web contents, filtering prevents access to the URLs and fully qualified domain names (FQDNs, host names of servers) included in these lists. Blacklists used in this filtering are generated by organizations, such as antivirus vendors, from their unique perspectives (see Non-Patent Literature 1).

Attackers sometimes partially change character strings of their URLs in order to avoid the URLs becoming targets to be filtered. For example, they may change "http://www.example.com/index1.html" to "http://www.example.com/index2.html". Thus, in order to make a character string of a URL a target to be filtered even if the character string is partially changed like this, a technique has been proposed, in which any Web contents existing on the same FQDN are regarded as those of a URL similar to a malicious URL and made a target to be filtered.

CITATION LIST

Non-Patent Literature

Non-Patent Literature 1: "Google Safe Browsing", [online], retrieved on Nov. 5, 2013 from the Internet <https://developers.google.com/safe-browsing/>

Non-Patent Literature 2: Zhou Zhou, et al., "A High-Performance URL Lookup Engine for URL Filtering Systems", IEEE ICC, 2010

SUMMARY

Technical Problem

However, with the above mentioned technique, when a URL similar to a malicious URL is made a target to be filtered, erroneous detection may be caused. Further, there is a problem that matching processing takes time, since, when the similar URL is made a target to be filtered, matching with a large number of URLs needs to be performed. In particular, filtering using a blacklist is normally performed at a gateway or Web proxy of a network, and matching needs to be performed targeting many communication destination URLs, and thus speeding up the matching is an important problem. Thus, the present invention solves the above described problems, and an object thereof is to provide a means to perform matching at high speed even if a URL is partially changed.

Solution to Problem

To solve the problems described above and achieve the object, a URL matching apparatus, comprising: a URL partial character string storage unit that stores therein partial character string information storing therein, as keys of an associative array, partial character strings obtained by connecting stepwise in order from a character string of an upper layer of a hierarchical structure of one or more reference uniform resource locators (URLs); a partial character string generating unit that generates partial character strings obtained by connecting stepwise in order from a character string of an upper layer of a hierarchical structure of a URL to be matched; and a searching unit that searches, for each of the generated partial character strings of the URL to be matched, the partial character string information with that partial character string being a key.

Advantageous Effects of Invention

According to the present invention, even if a URL is partially changed, matching is able to be performed at high speed.

DESCRIPTION OF EMBODIMENTS

Hereinafter, by referring to the drawings, embodiments of the present invention will be described, the embodiments divided into a first embodiment to a third embodiment. The present invention is not limited by these embodiments.

First Embodiment

Figure 1:
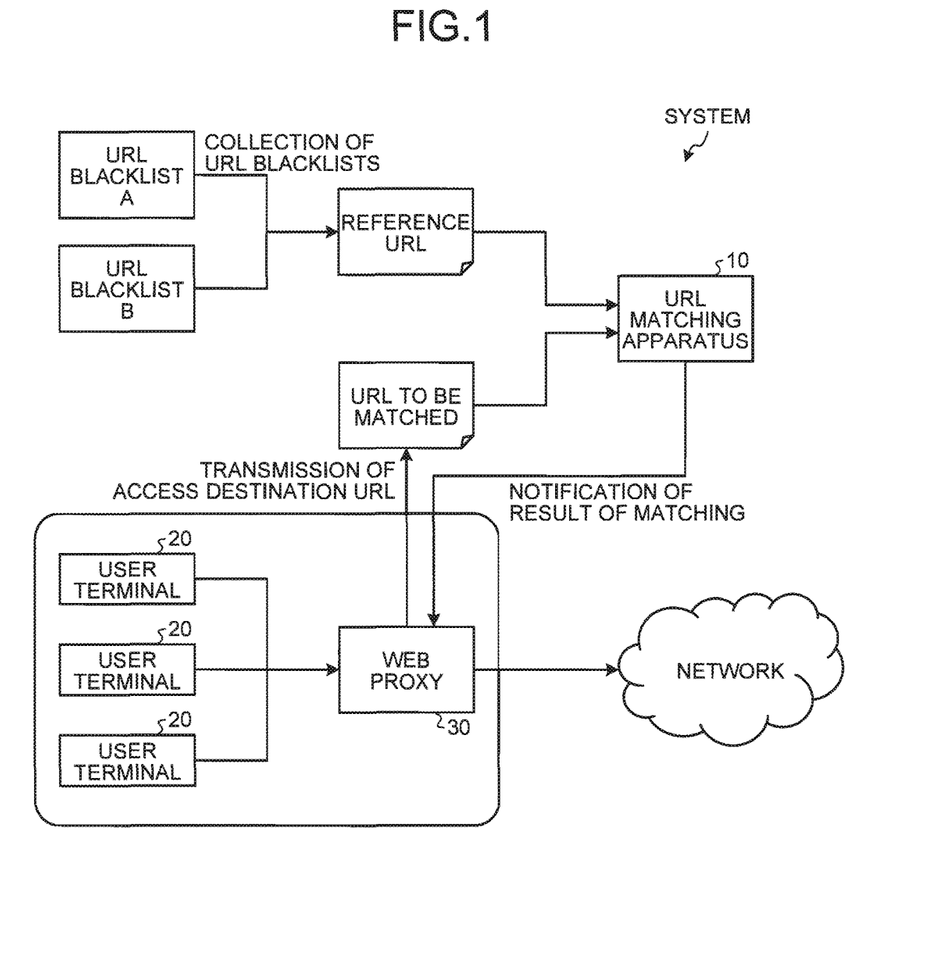
FIG. 1 is a diagram illustrating an example of a configuration of a system including a URL matching apparatus of each embodiment.

First of all, by use of FIG. 1, an example of a configuration of a system including a URL matching apparatus 10 of each embodiment will be described. FIG. 1 is a diagram illustrating the example of the configuration of the system including the URL matching apparatus of each embodiment. In the following example, a case, in which reference URLs are a list (for example, a URL blacklist) of URLs (malicious URLs) of malicious Web sites and malicious Web contents, will be described as an example, but the embodiment is not limited to this example.

The system is configured to include the URL matching apparatus 10, a user terminal 20, and a Web proxy 30. The user terminal 20 accesses a network via the Web proxy 30. The Web proxy 30 is a relay apparatus for when the user terminal 20 accesses the network, and records therein an access destination URL of the user terminal 20. The Web proxy 30 transmits this recorded access destination URL as a URL to be matched, to the URL matching apparatus 10.

The URL matching apparatus 10 determines whether or not the access destination URL matches any of a URL group (reference URLs) listed in URL blacklists A and B. That is, the URL matching apparatus 10 obtains the access destination URL of the user terminal 20 as the URL to be matched, and collects URL blacklists (lists of malicious URLs, for example, the URL blacklists A and B). The URL matching apparatus 10 then performs matching with the URL to be matched, with the URLs listed in these collected blacklists being the reference URLs. The URL matching apparatus 10 then notifies the Web proxy 30 or the like of a result of the matching (for example, information indicating how much the URL to be matched matches a reference URL).

Thereby, the URL matching apparatus 10 is able to notify an administrator or the like of the user terminal 20 of how much the access destination URL of the user terminal 20 matches the malicious URL.

Figure 2:
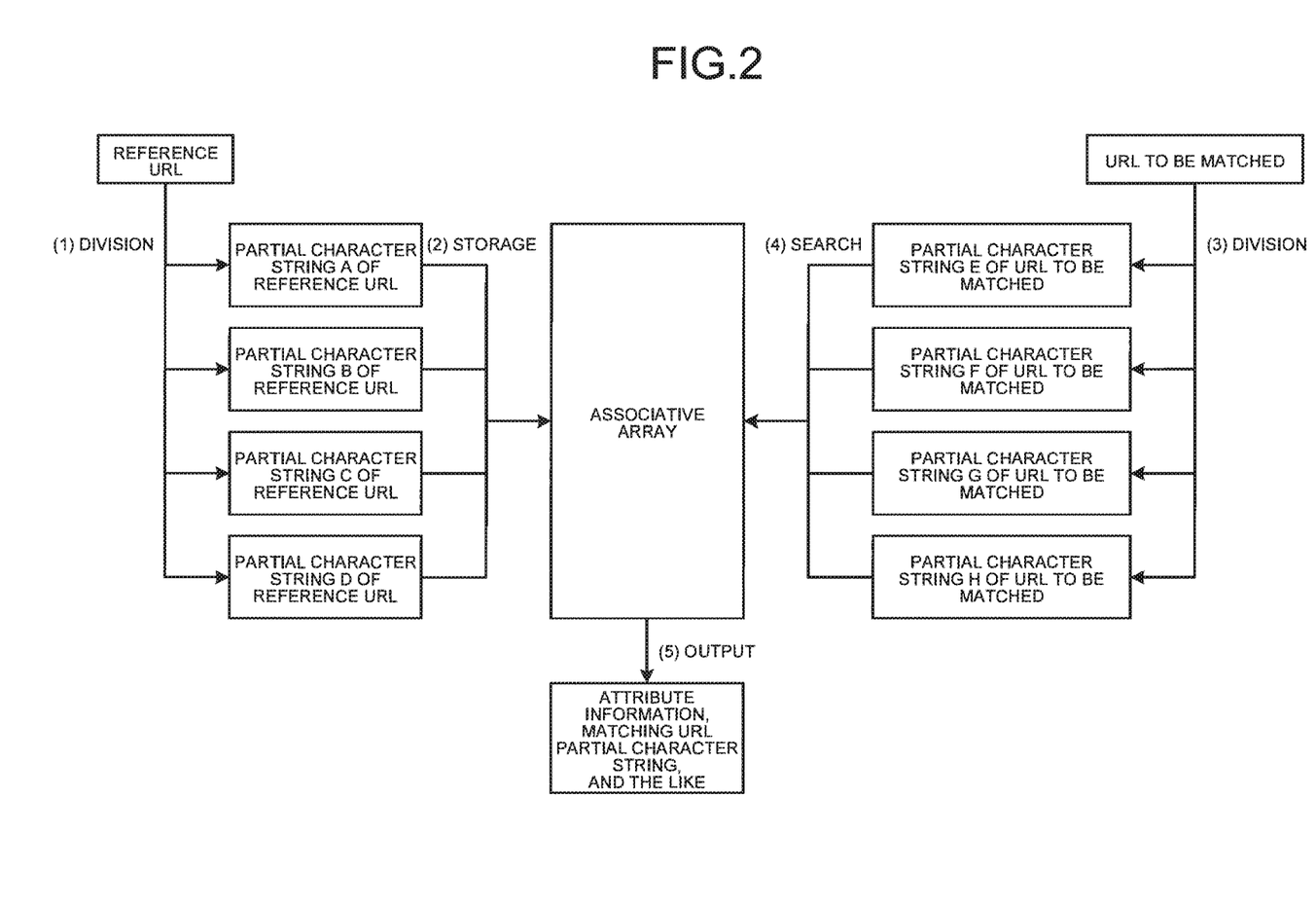
FIG. 2 is a diagram illustrating an outline of processing of the URL matching apparatus in FIG. 1.

Next, by use of FIG. 2, an outline of processing of the URL matching apparatus 10 will be described. FIG. 2 is a diagram illustrating the outline of the processing of the URL matching apparatus in FIG. 1.

The URL matching apparatus 10 divides a reference URL (a malicious URL listed in the blacklists) into partial character strings, for example, character strings separated by "." or "/". From the divided character strings, the URL matching apparatus 10 generates plural partial character strings, which have been connected stepwise in order from a character string of an upper layer of a hierarchical structure. For example, the URL matching apparatus 10 generates partial character strings A, B, C, and D of a reference URL ((1) division). For example, if a reference URL is "http://www.example.co.jp/path1/path2/index.php?id=123", the URL matching apparatus 10 generates partial character strings as illustrated with a reference sign 31 to a reference sign 36 in FIG. 3. In this generation of the partial character strings of the URL, a technique described in, for example, Japanese Patent Application Laid-open No. 2012-118713, is used.

Thereafter, the URL matching apparatus 10 stores the generated partial character strings as an associative array ((2) storage). An associative array is an array having character strings as keys, and examples of implementation include, a tree, a Patricia tree, and the like. By the partial character strings of the reference URL being stored as the associative array like this, search for partial character strings of a URL to be matched is able to be performed at high speed. Details of this associative array will be described later, but values corresponding to the keys (partial character strings) in the associative array are, for example, information (attribute information) indicating to which part/parts of the reference URL the partial character strings indicated by the keys correspond. In a specific example, a value is information indicating whether the corresponding partial character string is a part (partial domain) or all (a complete domain) of a domain of a reference URL, and/or whether the partial character string is a part (partial path) or all (a complete path) of a path part of the reference URL (see FIG. 4).

Next, the URL matching apparatus 10 generates partial character strings E, F, G, and H by dividing a URL to be matched ((3) division).

The URL matching apparatus 10 searches for the generated partial character strings of the URL to be matched from the partial character strings stored in the associative array ((4) search), and outputs a result of the search ((5) output). For example, the URL matching apparatus 10 searches for the partial character strings of the URL to be matched, and outputs attribute information of the partial character strings, matching partial character strings, and the like.

Thereby, even if the URL to be matched matches the reference URL partially, the URL matching apparatus 10 is able to notify a user of that fact. Further, the URL matching apparatus 10 is able to notify of how much the URL to be matched matches the reference URL. Furthermore, since in the URL matching apparatus 10, the partial character strings of the reference URL are stored as the associative array, even if there are a large number of partial character strings to be the keys, the search for the partial character strings of the URL to be matched is able to be performed at high speed.

Figure 5:
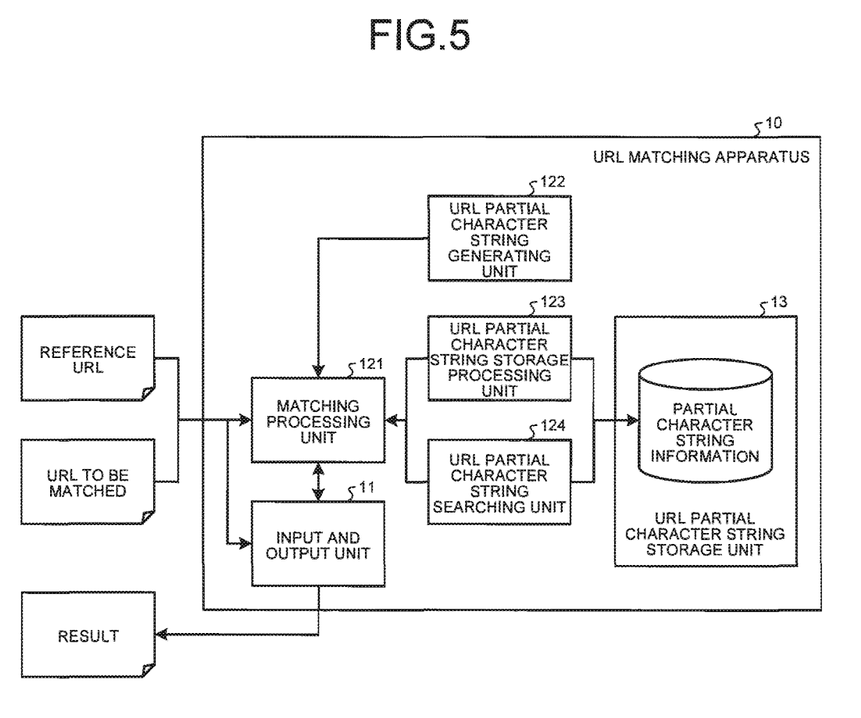
FIG. 5 is a functional block diagram illustrating a configuration of the URL matching apparatus in FIG. 1.

Next, a configuration of the URL matching apparatus 10 will be described. FIG. 5 is a functional block diagram illustrating the configuration of the URL matching apparatus in FIG. 1.

As illustrated in FIG. 5, the URL matching apparatus 10 includes an input and output unit 11, a matching processing unit 121, a URL partial character string generating unit 122, a URL partial character string storage processing unit 123, a URL partial character string searching unit 124, and a URL partial character string storage unit 13.

The input and output unit 11 controls data input and output to and from the URL matching apparatus 10. The input and output unit 11, for example, receives an input of the above described reference URL or the URL to be matched, and outputs a result of the matching between the reference URL and the URL to be matched (the search result from the partial character string information). This input and output unit 11 may include a communication interface function for performing data transmission and reception via the Internet, or the like.

The matching processing unit 121, the URL partial character string generating unit 122, the URL partial character string storage processing unit 123, and the URL partial character string searching unit 124 are implemented by program execution processing by a central processing unit (CPU) or by dedicated hardware, which is included in the URL matching apparatus 10.

The matching processing unit 121 performs matching between a reference URL and a URL to be matched, and outputs a result of the matching via the input and output unit 11. Specifically, when the matching processing unit 121 obtains a reference URL via the input and output unit 11, the matching processing unit 121 transfers this reference URL to the URL partial character string generating unit 122, and causes partial character strings generated by the URL partial character string generating unit 122 to be stored in the URL partial character string storage unit 13 via the URL partial character string storage processing unit 123. Further, when the matching processing unit 121 obtains a URL to be matched via the input and output unit 11, the matching processing unit 121 similarly transfers this URL to be matched, to the URL partial character string generating unit 122, and receives partial character strings generated by the URL partial character string generating unit 122. The matching processing unit 121 transfers these partial character strings of the URL to be matched, to the URL partial character string searching unit 124. Thereafter, when the matching processing unit 121 receives a result of search for the partial character strings from the URL partial character string searching unit 124, the matching processing unit 121 outputs the result of the search via the input and output unit 11.

The URL partial character string generating unit 122 generates partial character strings of a received URL (for example, a reference URL or a URL to be matched), and returns the generated partial character strings to the matching processing unit 121. This generation of the partial character strings of the URL is performed as follows, for example.

First, a configuration of a premised URL will be described. The URL has, as prescribed in Request For Comments (RFC) 1738, a configuration, like "http://<domain part>/<path part>". In this domain part, the FQDN of the Website is described. Further, in the path part, a character string indicating a location of Web contents on the Web site is described in a directory format. The domain part is a character string connecting elements from right to left having ". (dot)" as a delimiter, and for example, is expressed like "www.example.co.jp", for example. The respective elements of the domain part represent a broader concept to a narrower concept from right to left, and the rightmost element (jp) is called a top level domain, the second one from the right is called a second level domain, and a third one from the right is called a third level domain.

The path part is a character string connecting elements from left to right, having "/ (slash)" as a delimiter, and is expressed like, for example, "/path1/path2/index.html". The respective elements of the path part represent a broader concept to a narrower concept from left to right. At the end of the path part, a character string (a URL parameter) connected with "?" may be added. For example, like "/path1/path2/index.html?id=123", a URL parameter, "id=123", may be added. The URL partial character string generating unit 122 generates plural partial character strings, which have been connected stepwise in order from a character string of a broader concept (an upper layer of a hierarchical structure) for respective elements of a URL configured as described above.

Figure 3:
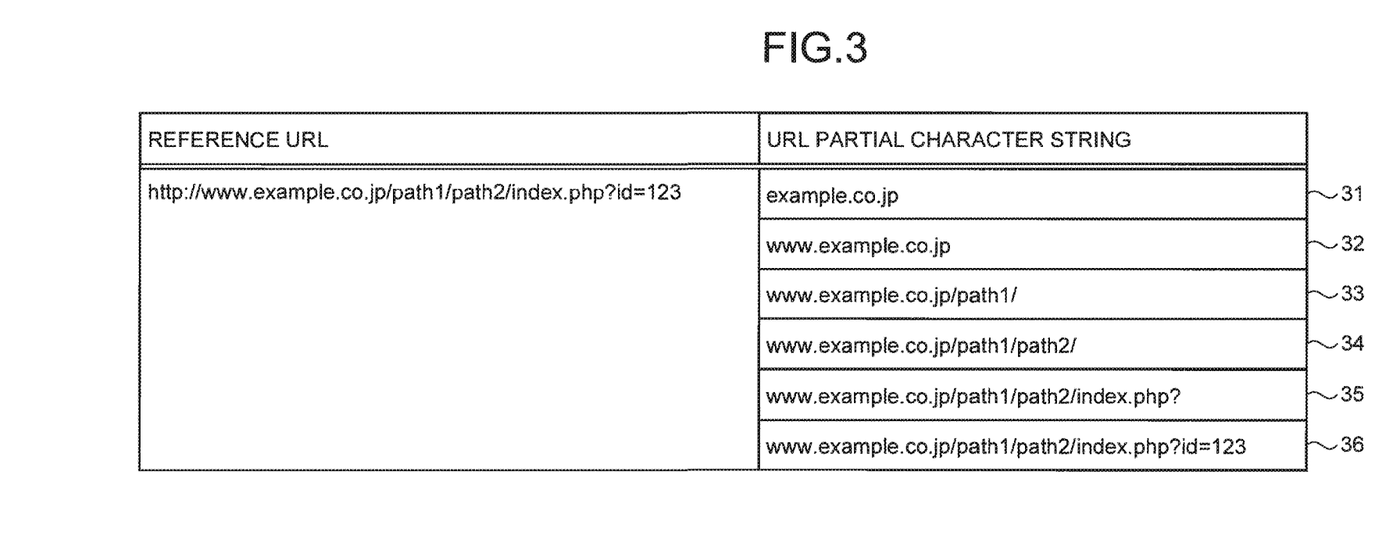
FIG. 3 is a diagram illustrating an example of partial character strings generated by the URL matching apparatus in FIG. 1.
Figure 6:
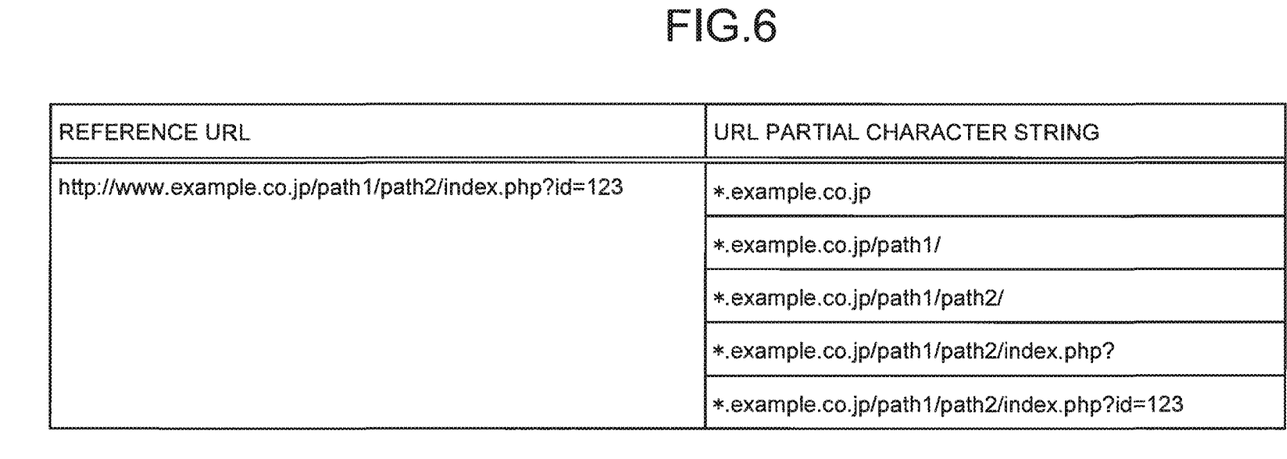
FIG. 6 is a diagram illustrating an example of partial character strings generated by the URL matching apparatus in FIG. 1.

Examples of these partial character strings generated by the URL partial character string generating unit 122 are illustrated in FIG. 3 and FIG. 6. For example, a case will be considered, where a URL, for which partial character strings are generated, is "http://www.example.co.jp/path1/path2/index.php?id=123". In this case, six partial character strings illustrated with the reference sign 31 to reference sign 36 in FIG. 3 are generated from the URL. That is, for "http://www.example.co.jp/path1/path2/index.php?id=123", when the domain part is "www.example.co.jp", a partial character string excluding "www" of the FQDN, a partial character string indicating the FQDN, a partial character string up to an upper most level of the path part, a partial character string up to a second upper level of the path part, a partial character string up to a third upper level of the path part, and a partial character string up to the end of the path part are generated.

In generating partial character strings, the URL partial character string generating unit 122 may make a public suffix ("co.jp", "jp", or the like, which is a domain having an unspecified large number of domains under itself) outside a target, for which partial character strings are generated.

Moreover, the partial character strings generated by the URL partial character string generating unit 122 may include "* (wild card)", like the example illustrated in FIG. 6. Thereby, the URL partial character string searching unit 124 is able to make a URL, with a host name of a domain part having been partially changed, also a target to be matched with the partial character strings of the partial character string information. For example, when a reference URL is "http://www.example.co.jp/path1/index.php?id=abc", "http://mail.example.co.jp/path1/index.php?id=abc" is also able to be matched therewith.

The URL partial character string storage processing unit 123 generates partial character string information storing therein, as an associative array, partial character strings of a reference URL generated by the URL partial character string generating unit 122. As described above, the associative array is formed of pairs of keys and values corresponding to the keys, and these keys are partial character strings of a URL, and the values are attribute information of these partial character strings. Attribute information is, for example, information indicating to which part/parts of a reference URL a partial character string indicated by a key corresponds.

Figure 4:
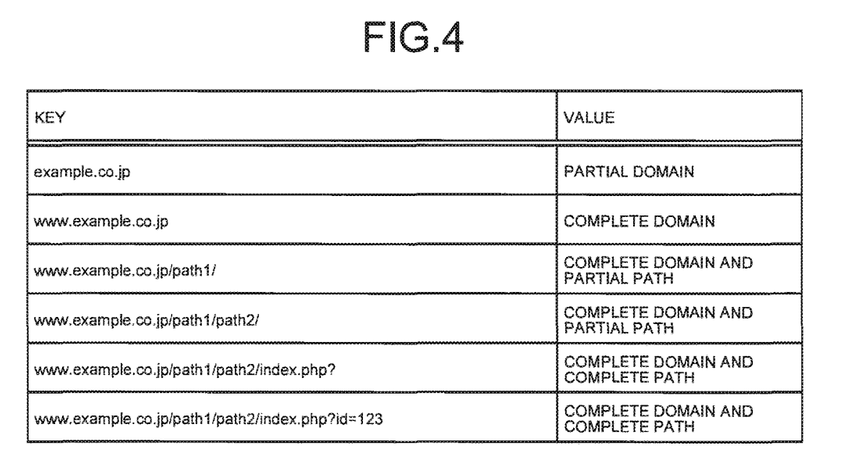
FIG. 4 is a diagram illustrating an example of partial character string information.
Figure 7:
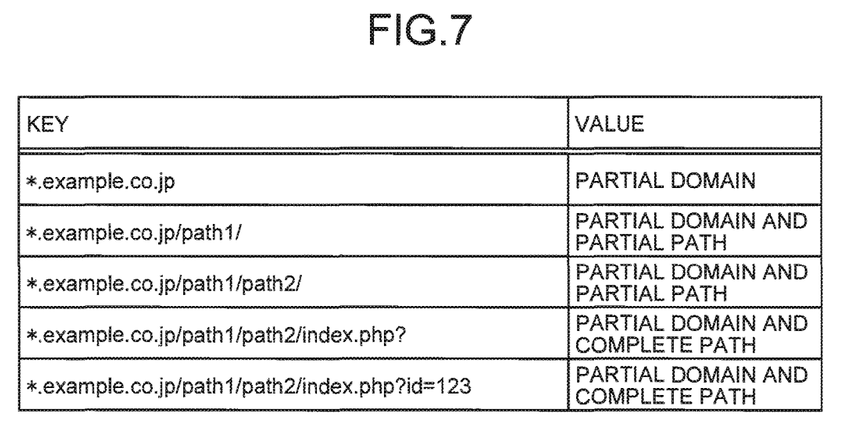
FIG. 7 is a diagram illustrating an example of partial character string information held by the URL matching apparatus in FIG. 1.

FIG. 4 and FIG. 7 are diagrams illustrating examples of partial character string information. The partial character string information illustrated in FIG. 4 is information representing partial character string information related to a reference URL, "http://www.example.co.jp/path1/path2/index.php?id=123". In the partial character string information illustrated in FIG. 4, partial character strings to be keys are "example.co.jp", "www.example.co.jp", "www.example.co.jp/path1/", "www.example.co.jp/path1/path2/", "www.example.co.jp/path1/path2/index.php?", and "http://www.example.co.jp/path1/path2/index.php?id=123", and values corresponding respectively thereto are attribute information, which is "partial domain", "complete domain", "complete domain and partial path", "complete domain and partial path", "complete domain and partial path", and "complete domain and complete path". "Partial domain" means that the partial character string is a partial domain name of the reference URL, and "complete domain" means that the partial character string is a complete domain name (that is, the FQDN) of the reference URL. Similarly for the path, "partial path" means a partial path name of the reference URL, and "complete path" means a complete path name of the reference URL.

By setting, as the keys of this partial character string information, partial character strings separated stepwise for each level of the reference URL, the URL partial character string searching unit 124 is able to obtain a matching result for a URL having a character string partially different from a URL to be matched, such as a URL, in which a character string of an upper level of the URL is the same as that of the URL to be matched and a character string of a lower level (for example, the path part, or the like) of the URL is different from that of the URL to be matched.

Further, by storing partial character strings as keys of an associative array in partial character string information, the URL partial character string storage processing unit 123 is able to suppress reduction in search speed even if the number of elements stored in the partial character string information is increased.

Other than the above described information, the attribute information added to the partial character string information may be information indicating a numerical value (matching ratio, or the number of matching characters) or the like expressing how much the partial character strings of the URL match the reference URL.

Furthermore, as an example is illustrated in FIG. 7, "* (wild card)" may be used for the partial character strings in the key column of the partial character string information.

Figure 8:
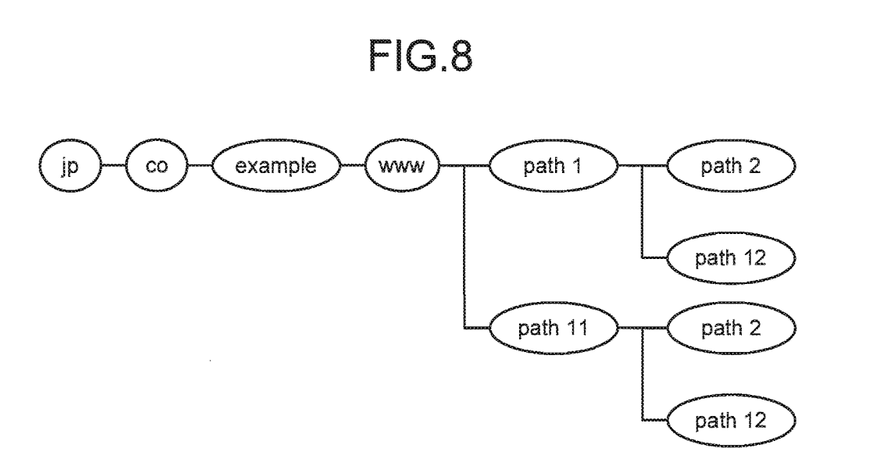
FIG. 8 is a diagram illustrating an example of implementation of partial character strings to be keys of partial character string information.

As described above, the partial character strings to be the keys of the partial character string information are implemented by, for example, a tree structure, such as a trie or a Patricia tree. FIG. 8 is a diagram illustrating an example of implementation of partial character strings to be keys of partial character string information. For example, if, for partial character strings partially different from one another, like "http://www.example.co.jp/path1/path2/", "http://www.example.co.jp/path11/path2/", "http://www.example.co.jp/path1/path12/", and "http://www.example.co.jp/path11/path12/", these are stored as keys, as an example is illustrated in FIG. 8, the partial character strings are implemented by a tree structure having common parts of the partial character strings of the URL as common nodes. Thereby, the partial character strings to be the keys of the partial character string information are able to be efficiently stored.

When the URL partial character string searching unit 124 receives the partial character strings of the URL to be matched from the URL partial character string generating unit 122, the URL partial character string searching unit 124 searches, for each of these partial character strings, the partial character string information with that partial character string being the key. For example, with the partial character string of the URL to be matched being the key, the URL partial character string searching unit 124 searches for attribute information of the partial character string from the partial character string information. A result of the search is output via the input and output unit 11. This result of the search is, for example, information indicating: that as a result of the search, attribute information of the partial character string has been hit; the partial character string for which the attribute information has been hit; the hit attribute information; that no attribute information has been hit, that is, that there was no corresponding partial character string; and the like.

For example, if "www.example.co.jp/path1/" is matching, as a result of the URL partial character string searching unit 124 searching the partial character string information illustrated in FIG. 4, the URL partial character string searching unit 124 outputs a search result indicating that an attribute value corresponding to that partial character string is "complete domain and partial path". By the URL partial character string searching unit 124 outputting such attribute information, a user of the URL matching apparatus 10 is able to know how much the URL to be matched matches the reference URL.

The URL partial character string storage unit 13 stores therein the partial character string information generated by the URL partial character string storage processing unit 123. This URL partial character string storage unit 13 is implemented by a storage means (for example, a hard disk drive (HDD), a random access memory (RAM), or the like) included in the URL matching apparatus 10.

Figure 9:
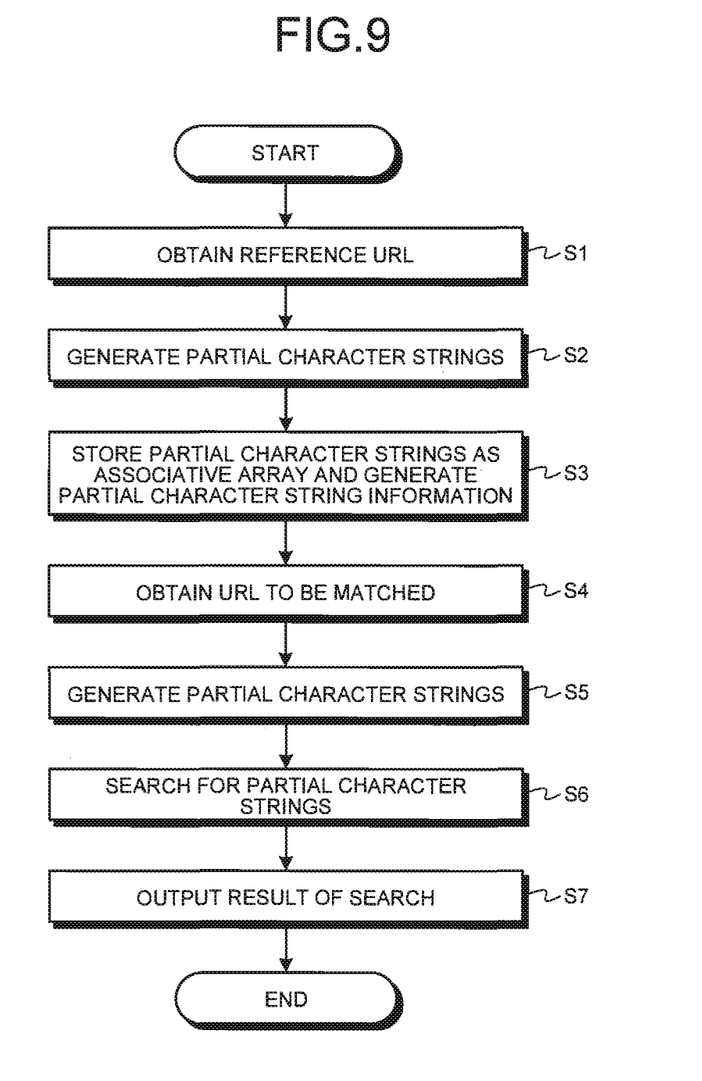
FIG. 9 is a flow chart illustrating a processing sequence of the URL matching apparatus in FIG. 1.

Next, by use of FIG. 9, a processing sequence of the URL matching apparatus 10 will be described. FIG. 9 is a flow chart illustrating the processing sequence of the URL matching apparatus in FIG. 1.

First, when the matching processing unit 121 of the URL matching apparatus 10 obtains a reference URL via the input and output unit 11 (S1), the matching processing unit 121 transfers this reference URL to the URL partial character string generating unit 122, and the URL partial character string generating unit 122 generates partial character strings of the reference URL (S2).

Next, the matching processing unit 121 transfers the partial character strings of the reference URL generated in S2, and the URL partial character string storage processing unit 123 stores the partial character strings as an associative array and generates partial character string information (S3). That is, the URL partial character string storage processing unit 123 arranges the partial character strings generated in S2 as keys of the partial character string information, and associates attribute information of the partial character strings thereto as values corresponding to the respective partial character strings. That is, for each of the partial character strings generated in S2, the URL partial character string storage processing unit 123 generates partial character string information added with attribute information indicating which part/parts of the reference URL (for example, all or a part of a domain part of the reference URL, and/or all or a part of a path part thereof) that partial character string is.

Thereafter, when the matching processing unit 121 obtains a URL to be matched via the input and output unit 11 (S4), the matching processing unit 121 transfers this URL to be matched, to the URL partial character string generating unit 122, and the URL partial character string generating unit 122 generates partial character strings of the URL to be matched (S5). The matching processing unit 121 then transfers the partial character strings of the URL to be matched generated in S5 to the URL partial character string searching unit 124, and the URL partial character string searching unit 124 searches for attribute information from the partial character string information with these partial character strings of the URL to be matched being keys (S6: partial character string search). The URL partial character string searching unit 124 outputs a result of the search (S7).

Thereby, even if the URL to be matched matches the reference URL partially, the URL matching apparatus 10 is able to notify a user of that fact. Furthermore, since the URL matching apparatus 10 stores the partial character strings of the reference URL as the keys of the associative array in the partial character string information, search for the partial character strings of the URL to be matched is able to be performed at high speed.

Second Embodiment

As a result of the search by the URL partial character string searching unit 124, plural matching results may be obtained. For example, there is a case where a reference URL is "http://www.example.co.jp/path1/path2/index.php?id=123" and a URL to be matched is "http://www.example.co.jp/path1/path2/test.html". In this case, the matching partial character strings are "example.co.jp (partial domain)", "www.example.co.jp (complete domain)", "www.example.co.jp/path1/ (complete domain and partial path)", and "www.example.co.jp/path1/path2/ (complete domain and partial path)", meaning that plural matching results are obtained. In this case, the URL partial character string searching unit 124 may output a result of the search by preferentially outputting the one highly matching the reference URL.

Degrees of matching of partial character strings indicated by attribute information of partial character string information are as follows, in descending order of degree of matching. Complete domain and complete path→complete domain and partial path→partial domain and partial path- →partial domain. Therefore, if plural matching results are present, the URL partial character string searching unit 124 preferentially outputs a matching result with a higher degree of matching. For example, in the above described example, the URL partial character string searching unit 124 outputs "complete domain and partial path", which is attribute information with a high degree of matching.

Thereby, a user of the URL matching apparatus 10 is able to check how much a URL to be matched matches a reference URL.

Moreover, the URL partial character string searching unit 124 may determine the above described degree of matching with the reference URL in consideration of, not only the attribute information retrieved from the character string information, but also the number of characters of the matching partial character string. For example, in the above example, there are two partial character strings, having the attribute information, "complete domain and partial path". That is, there are "www.example.co.jp/path1/ (complete domain and partial path)", and "www.example.co.jp/path1/path2/ (complete domain and partial path)". In such a case, of these partial character strings, the URL partial character string searching unit 124 preferentially outputs the partial character string having a longer character string. For example, of these partial character strings, the URL partial character string searching unit 124 outputs the partial character string having the longest character string.

In the above described example, the character string, "www.example.co.jp/path1/path2/" is longer than the character string, "www.example.co.jp/path1/". The URL partial character string searching unit 124 thus selects and outputs "www.example.co.jp/path1/path2/" therefrom. Thereby, a user of the URL matching apparatus 10 is able to more easily check a character string of up to which level of a URL to be matched matches a reference URL.

Third Embodiment

For partial character strings of a URL to be keys in a key part (that is, a part of the partial character strings) of partial character string information, respective elements of their domain parts may be arranged with the left and right reversed.

Figure 10:
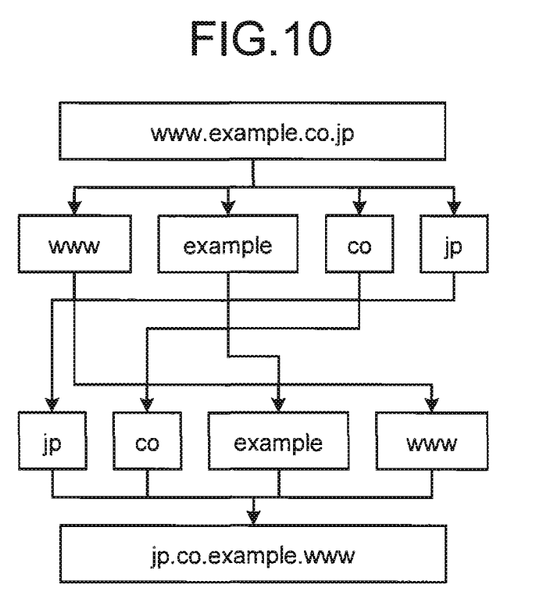
FIG. 10 is a diagram illustrating an example of rearrangement of respective elements of a domain part of a URL.

FIG. 10 is a diagram illustrating an example of rearrangement of respective elements of a domain part of a URL. Herein, description will be made with "www.example.co.jp" as an example. As illustrated in FIG. 10, the URL partial character string generating unit 122 rearranges respective elements of "www.example.co.jp" with the left and right reversed, into "jp.co.example.www". Thereafter, the URL partial character string storage processing unit 123 stores the rearranged "jp.co.example.www" as a key of partial character string information.

That is, in a key column of the partial character string information, the URL partial character string storage processing unit 123 arranges the elements, with a top level domain (for example, "jp") or a second level domain (for example, "co.jp") of a domain part of the reference URL at the head thereof. Thereby, when the partial character strings to be the keys of the partial character string information are arranged in a tree structure, such as a trie or a Patricia tree, even if a part common to character strings, which are prefixes of the respective partial character strings, is small, each partial character string is able to be efficiently stored.

Figure 11:
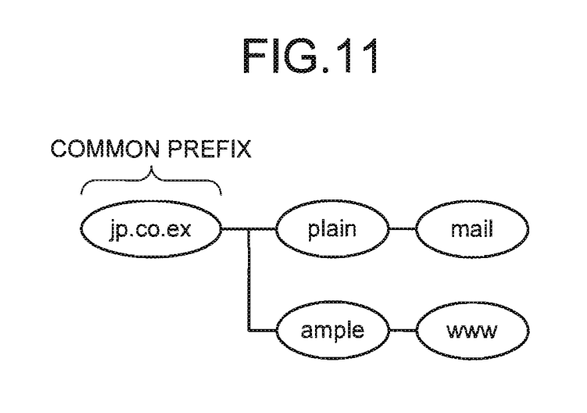
FIG. 11 is a diagram for explanation of a common prefix of partial character strings.

For example, a case is considered, where domain parts of two reference URLs are respectively "www.example.co.jp" and "mail.explain.co.jp". In this case, since the character strings of the respective domain parts are different from each other from the head parts thereof, a common prefix in a trie, a Patricia tree, or the like is not present, normally. However, when the elements of "www.example.co.jp" and "mail.explain.co.jp" are arranged with the left and right thereof reversed, "jp.co.example.www" and "jp.co.explain.mail" are obtained. Thereby, as illustrated in FIG. 11, since up to "jp.co.ex" is able to be made a common prefix of the partial character strings, partial character strings of a key column of partial character string information are able to be efficiently stored.

A separator used in connecting character strings of the respective elements that have been reversed is, for example, ". (dot)", "_ (underscore)", or the like. Furthermore, when the URL partial character string searching unit 124 searches partial character string information having partial character strings with the left and right of the domain parts of the reference URL reversely arranged, the URL partial character string searching unit 124 performs the search by use of partial character strings with the left and right of domain parts of a URL to be matched reversely arranged.

(Program)

In addition, a program may be generated, which describes the processing executed by URL matching apparatus 10 in a language executable by a computer. In this case, by the computer executing the program, effects that are the same as those of the above described embodiments are able to be obtained. Moreover, by recording that program in a computer readable recording medium and causing the computer to load and execute the program recorded in this recording medium, processing that is the same as that of the above described embodiments may be realized. Hereinafter, an example of a computer, which executes a URL matching program that realizes functions that are the same as those of the URL matching apparatus 10, will be described.

Figure 12:
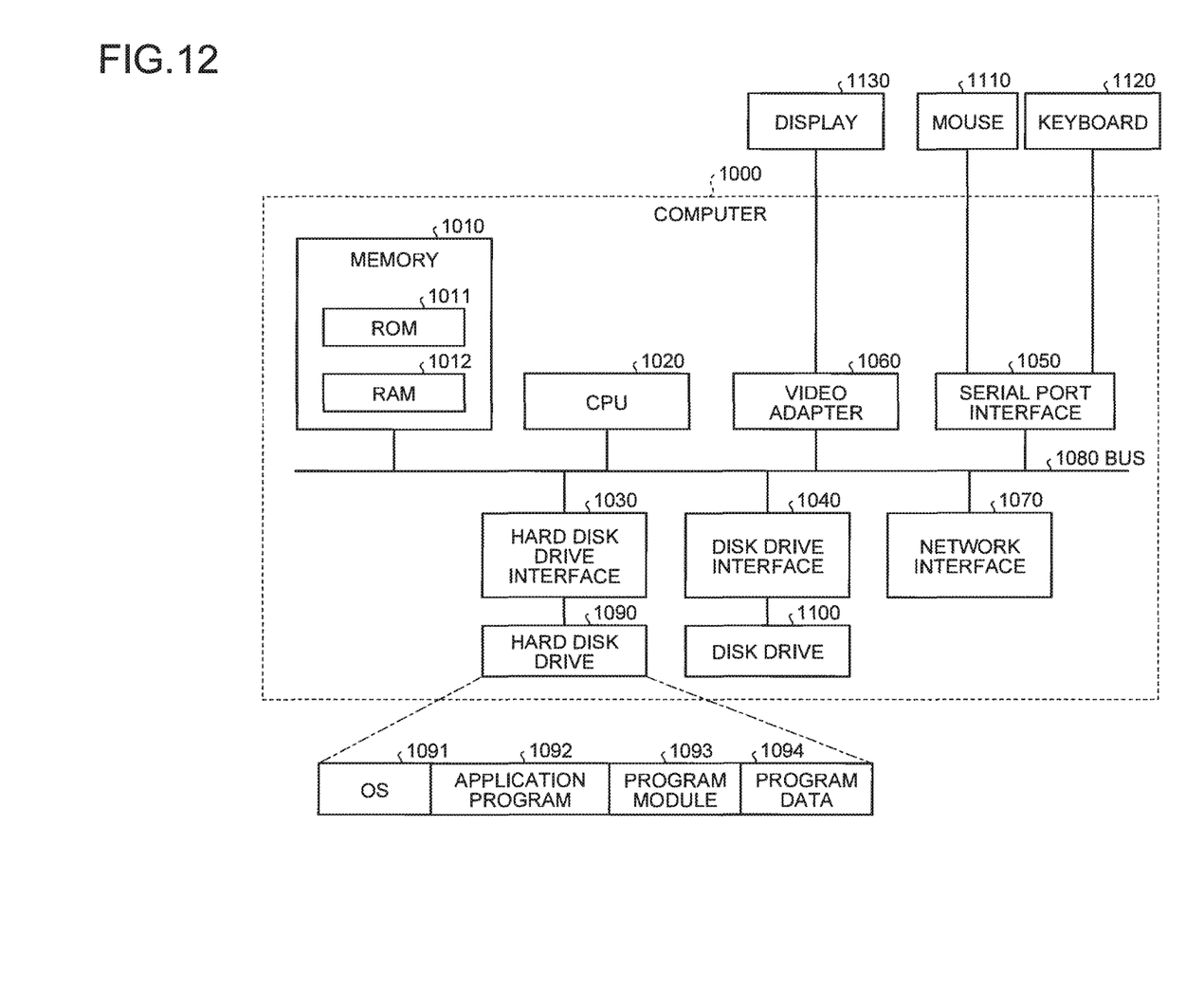
FIG. 12 is a diagram illustrating a computer that executes a URL matching program.

FIG. 12 is a diagram illustrating the computer that executes the URL matching program. As illustrated in FIG. 12, a computer 1000 has, for example, a memory 1010, a CPU 1020, a hard disk drive interface 1030, a disk drive interface 1040, a serial port interface 1050, a video adapter 1060, and a network interface 1070. These units are connected to one another via a bus 1080.

The memory 1010 includes a read only memory (ROM) 1011 and a RAM 1012. The ROM 1011 stores therein a boot program, such as a basic input output system (BIOS), for example. The hard disk drive interface 1030 is connected to a hard disk drive 1090. The disk drive interface 1040 is connected to a disk drive 1100. An attachable and detachable storage medium, such as a magnetic disk or an optical disk, for example, is inserted in the disk drive 1100. A mouse 1110 and a keyboard 1120, for example, are connected to the serial port interface 1050. A display 1130, for example, is connected to the video adapter 1060.

As illustrated in FIG. 12, the hard disk drive 1090 stores therein, for example, an OS 1091, an application program 1092, a program module 1093, and program data 1094. Each table described in the above embodiments is stored in, for example, the hard disk drive 1090 or the memory 1010.

Further, the URL matching program is stored in the hard disk drive 1090, as a program module for example, in which commands executed by the computer 1000 are described. Specifically, a program module, in which the processing executed in the URL matching explained with respect to the above embodiments is described, is stored in the hard disk drive 1090.

Furthermore, data used in information processing by the URL matching program are stored in, for example, the hard disk drive 1090, as program data. The CPU 1020 loads the program module 1093 or the program data 1094 stored in the hard disk drive 1090 as necessary into the RAM 1012 and executes the above described sequences.

The program module 1093 and the program data 1094 related to the URL matching program are not limited to the case of being stored in the hard disk drive 1090, and may be, for example, stored in an attachable and detachable storage medium and read out by the CPU 1020 via the disk drive 1100, or the like. Or, the program module 1093 and program data 1094 related to the URL matching program may be stored in another computer connected via a network, such as a local area network (LAN) or a wide area network (WAN), and read out by the CPU 1020 via the network interface 1070.

REFERENCE SIGNS LIST

10 URL MATCHING APPARATUS
11 INPUT AND OUTPUT UNIT
13 URL PARTIAL CHARACTER STRING STORAGE UNIT
20 USER TERMINAL
30 WEB PROXY
121 MATCHING PROCESSING UNIT
122 URL PARTIAL CHARACTER STRING GENERATING UNIT
123 URL PARTIAL CHARACTER STRING STORAGE PROCESSING UNIT
124 URL PARTIAL CHARACTER STRING SEARCHING UNIT

The invention claimed is:

1. A URL matching apparatus, comprising:
a memory that stores therein partial character string information storing therein, as keys of an associative array, partial character strings obtained by connecting stepwise in order from a character string of an upper layer of a hierarchical structure of one or more reference uniform resource locators (URLs); and
processing circuitry configured to
receive, from a location between a user terminal and a network, an input of an access destination URL requested by the user terminal for accessing a web page from the network, the access destination URL being a URL to be matched,
generate partial character strings obtained by connecting stepwise in order from a character string of an upper layer of a hierarchical structure of a URL to be matched to one or more lower layers of the hierarchical structure of the URL to be matched, the upper layer corresponding to a top level domain of a URL and the one or more lower layers corresponding to elements of a URL outside of the top level domain and which include a path part of the URL; and
search, for each of the generated partial character strings of the URL to be matched, the partial character string information with that partial character string being a key,
wherein
the partial character string information is information indicating the partial character strings and attribute information indicating a predetermined descriptive value, from a predetermined set of descriptive values, about which layer of the hierarchical structure of the reference URL the partial character string matches in association with each other, and the processing circuitry searches the partial character string information with the partial character string of the URL to be matched being the key, and outputs a result to indicate which lower layer of the hierarchical structure of the reference URL the URL to be matched matches,
wherein at least one partial character string is obtained by rearranging respective elements of a domain of a URL with a left and right part of the domain being reversed.

2. The URL matching apparatus according to claim 1, wherein the attribute information is information indicating whether the partial character string matches all of or matches a part of each of a domain part and a path part of the reference URL.

3. The URL matching apparatus according to claim 1, wherein the processing circuitry refers to the attribute information of each of the partial character strings that have been searched for, and preferentially outputs a partial character string with a high degree of matching with the reference URL.

4. The URL matching apparatus according to claim 1, wherein the partial character strings in the partial character string information are character strings obtained by connecting stepwise in order from a character string of a top level domain of the reference URL, and are character strings, from which character strings having head parts of domain parts of the reference URLs are extracted as a common prefix of a trie or a Patricia tree, the head parts common to the respective URLs.

5. A URL matching method, in which a computer executes:
receiving, from a location between a user terminal and a network, an input of an access destination URL requested by the user terminal for accessing a web page from the network, the access destination URL being a URL to be matched,
generating partial character strings obtained by connecting stepwise in order from a character string of an upper layer of a hierarchical structure of a URL to be matched to one or more lower layers of the hierarchical structure of the URL to be matched; and
searching, for each of the generated partial character strings of the URL to be matched, partial character string information of one or more reference URLs with that partial character string being a key, wherein
the partial character string information is information storing therein, as keys of an associative array, partial character strings obtained by connecting stepwise in order from a character string of an upper layer of a hierarchical structure of the one or more reference URLs, the upper layer corresponding to a top level domain of a URL and the one or more lower layers corresponding to elements of a URL outside of the top level domain and which include a path part of the URL, wherein
the partial character string information is information indicating the partial character strings and attribute information indicating a predetermined descriptive value, from a predetermined set of descriptive values, about which layer of the hierarchical structure of the reference URL the partial character string matches in association with each other, and
the method further includes searching the partial character string information with the partial character string of the URL to be matched being the key, and outputting a result to indicate which lower layer of the hierarchical structure of the reference URL the URL to be matched matches, wherein at least one partial character string is obtained by rearranging respective elements of a domain of a URL with a left and right part of the domain being reversed.

6. A non-transitory computer readable storage medium having stored therein a URL matching program that causes a computer to execute a process comprising:

receiving, from a location between a user terminal and a network, an input of an access destination URL requested by the user terminal for accessing a web page from the network, the access destination URL being a URL to be matched, generating partial character strings obtained by connecting stepwise in order from a character string of an upper layer of a hierarchical structure of a URL to be matched to one or more lower layers of the hierarchical structure of the URL to be matched; and searching, for each of the generated partial character strings of the URL to be matched, partial character string information of one or more reference URLs with that partial character string being a key, wherein the partial character string information is information storing therein, as keys of an associative array, partial character strings obtained by connecting stepwise in order from a character string of an upper layer of a hierarchical structure of the one or more reference URLs, the upper layer corresponding to a top level domain of a URL and the one or more lower layers corresponding to elements of a URL outside of the top level domain and which include a path part of the URL, wherein the partial character string information is information indicating the partial character strings and attribute information indicating a predetermined descriptive value, from a predetermined set of descriptive values, about which layer of the hierarchical structure of the reference URL the partial character string matches in association with each other, and the method further includes searching the partial character string information with the partial character string of the URL to be matched being the key, and outputting a result to indicate which lower layer of the hierarchical structure of the reference URL the URL to be matched matches, wherein at least one partial character string is obtained by rearranging respective elements of a domain of a URL with a left and right part of the domain being reversed.

* * * * *